US006356826B1

(12) United States Patent
Pohjola

(10) Patent No.: US 6,356,826 B1
(45) Date of Patent: Mar. 12, 2002

(54) INTELLIGENT CURRENT DISTRIBUTION SYSTEM FOR VEHICLES AND METHOD FOR MANUFACTURING THE SAME

(75) Inventor: Jorma Pohjola, Varjakka (FI)

(73) Assignee: IWS International Inc., Oulu (FI)

( * ) Notice: Subject to any disclaimer, the term of this patent is extended or adjusted under 35 U.S.C. 154(b) by 0 days.

(21) Appl. No.: 09/554,370

(22) PCT Filed: Nov. 13, 1998

(86) PCT No.: PCT/FI98/00886

§ 371 Date: May 12, 2000

§ 102(e) Date: May 12, 2000

(87) PCT Pub. No.: WO99/25586

PCT Pub. Date: May 27, 1999

(30) Foreign Application Priority Data

Nov. 14, 1997 (FI) .................................................. 974237
Nov. 14, 1997 (FI) .................................................. 974238
Sep. 7, 1998 (FI) .................................................. 981907

(51) Int. Cl.$^7$ ............................................... B60Q 1/26
(52) U.S. Cl. .......................... 701/36; 701/33; 701/102; 340/825.06; 361/826
(58) Field of Search ............................... 701/33, 36, 45, 701/48, 29, 102, 115; 340/825.06; 361/826

(56) References Cited

U.S. PATENT DOCUMENTS

| 4,180,803 A | 12/1979 | Wesmeyer et al. ...... 340/164 R |
| 4,355,385 A | 10/1982 | Hampshire et al. ........... 370/85 |
| 4,516,121 A | 5/1985 | Moriyama et al. ..... 340/825.05 |
| 4,646,232 A | 2/1987 | Chang et al. ................ 364/200 |
| 5,637,933 A | 6/1997 | Rawlings et al. ........... 307/147 |
| 5,670,845 A * | 9/1997 | Grant et al. .................... 315/77 |

FOREIGN PATENT DOCUMENTS

| EP | 0266704 | 5/1988 | ........... B60R/16/02 |
| EP | 0791506 | 8/1997 | ........... B60R/16/02 |
| SE | 0507046 | 3/1998 | ........... G06F/13/40 |
| WO | 9830961 | 7/1998 | ........... G06F/13/40 |

* cited by examiner

Primary Examiner—William A. Cuchlinski, Jr.
Assistant Examiner—Arthur D. Donnelly
(74) Attorney, Agent, or Firm—Davidson, Davidson & Kappel, LLC

(57) ABSTRACT

The invention relates to an intelligent current distribution system for vehicles and a method for manufacturing the system. In the system, the current is distributed to loads through intelligent connecting sockets (1). The sockets are mounted in desired locations on a cable (2), whose message communication bus (11) or a socket input-connector (7) is used to deliver control commands to control electronics (14–17) controlling operation of the socket. The control electronics include a basic program memory (16), in which are stored operating instruction programs for all necessary functions of several sockets in the system. Thus, any socket can be randomly located at least within a limited portion of the current distribution system. The socket is modified for individual operation during or after installation of the socket. Therefore, in the parameter program memory (17) there are stored parameter programs, which control individually the functions of a socket and which are predetermined specifically for each socket. The parameter programs control only a limited number of the function control programs of the basic program memory (16) to make only predetermined function control selections for said individual operation.

13 Claims, 2 Drawing Sheets

Figure 1:
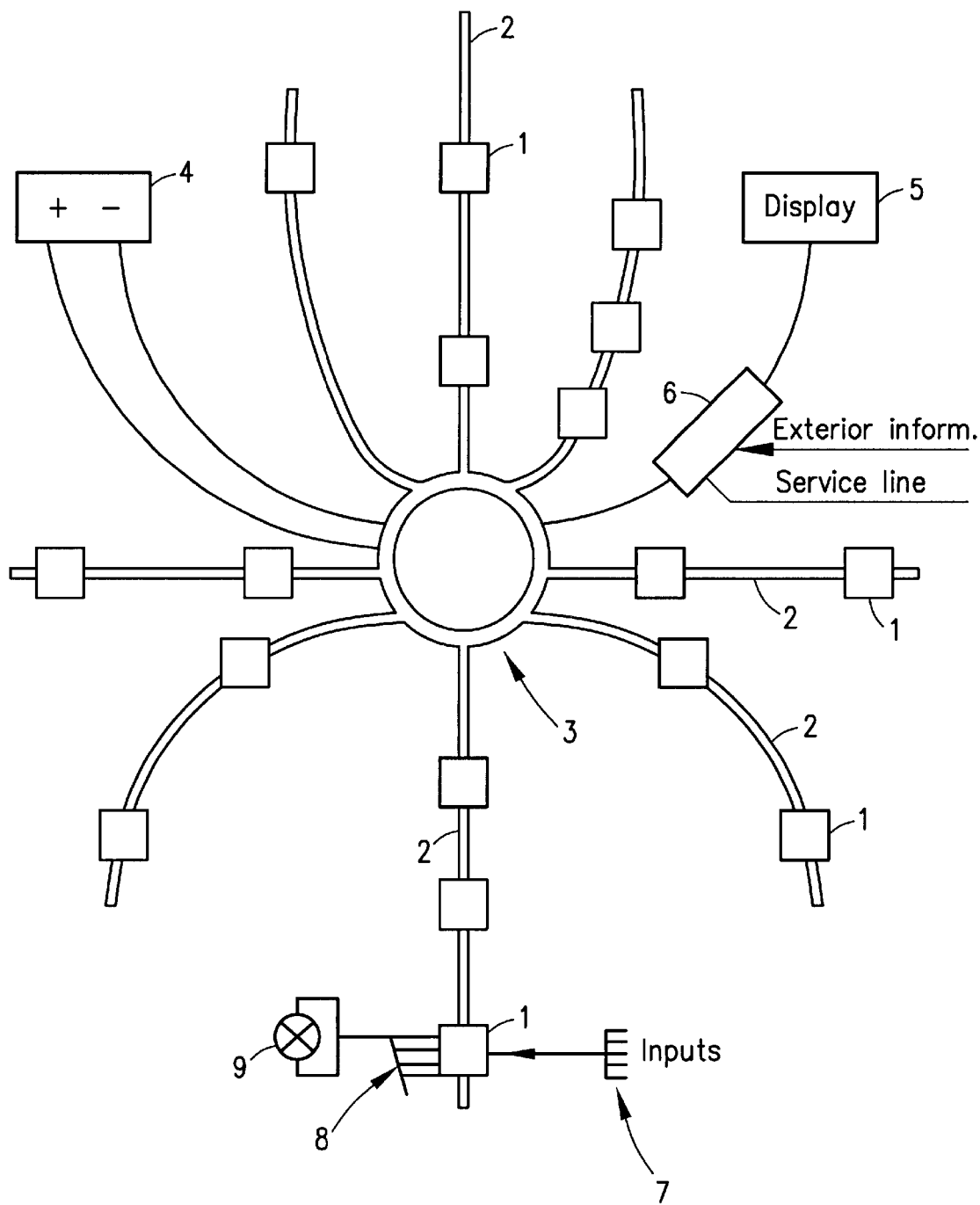

INTELLIGENT CURRENT DISTRIBUTION SYSTEM FOR VEHICLES AND METHOD FOR MANUFACTURING THE SAME

The present invention relates to a method for manufacturing an intelligent current distribution system for vehicles, in which method a current distribution cable is fitted with intelligent connecting sockets provided with output-connectors for supplying current to actuators to be connected to the system and switches for distributing current to the output connectors, as well as control electronics for controlling the switches on the basis of control commands received from a message communication bus of the cable or an input connector of the socket, the control electronics of each socket being provided with basic program for running sets of operation control instructions to perform various functions determined by the control commands.

The invention relates also to an intelligent current distribution system for vehicles, said system comprising:
  a current distribution cable provided with one or more current conductors
  at least one message communication bus
  intelligent sockets, which are connected to the current conductor and to the message communication bus and which are provided with control electronics controlling operation of the socket and containing operating instructions specific for each socket for distributing current to actuators connected to the socket by way of controllable switches in response to control commands received from the message communication bus or from an input-connector of the socket, as well as operation control instructions for transmitting malfunction or control messages to the message communication bus.

This type of current distribution systems are prior known e.g. from publications WO 93/10951, WO 95/15594, EP-564943, and WO 97102965.

A weakness in these prior known systems is that too much intelligence required for control messages of functions is concentrated in the central unit of the system, whereby the communication becomes congested and the system is impaired in terms of its operating reliability. In order to reduce this drawback there has been proposed in European patent application EP-0 791 506 A2 to use highly intelligent node controllers under control of a central controller which sends a single command addressed to the proper intelligent node which in turn is provided with individual operation instructions for controlling the load connected to the node. One of the node controllers may be employed as a central controller. Because of need of the central controller there is still considerable reciprocating traffic between every node and the central controller which has to transmit every single command, query its performance and receive any condition messages from the nodes. Addressing the commands with node specific addresses provides an additional burden to data transmission because many of the commands or control messages are planned to be recognized or identified by several nodes.

One of the most serious defects of this prior art system is the lack of universal productability of the sockets because each socket has an individual assortment of operation control instructions. The specification of EP0 791 506 A2 does not propose any solution to avoid "taylor made" production in order to provide each node with node specific instructions.

This is a serious shortcoming in all the prior known systems, wherein various optional applications of the system (such as various vehicle types or modifications even within a single vehicle type) cannot be flexibly manufactured on an automated line. The fluctuation in the level of loads and accessories in various models of even a single make of automobile causes considerable fluctuation in functions that the sockets are required to have. When applying the system to various makes of automobiles and various types of vehicles, the number of various optional embodiments becomes very large indeed. It is obvious that the manufacturing of various optional embodiments on an automated line becomes problematic, if the intelligence is decentralized in such a manner that the sockets are provided with individual intelligence as required by the operating demands of various loads or actuators connected therewith.

An object of the invention is to solve the above problem and to provide a current distribution system, which has a universal applicability and which nevertheless can be manufactured in a flexible manner on an automated line. Another object of the invention is to provide a method for manufacturing such a system with high automation level.

This object is achieved according to the invention by means of a method as set forth in the annexed claim I and by means of a system as set forth in claim 2.

Figure 2:
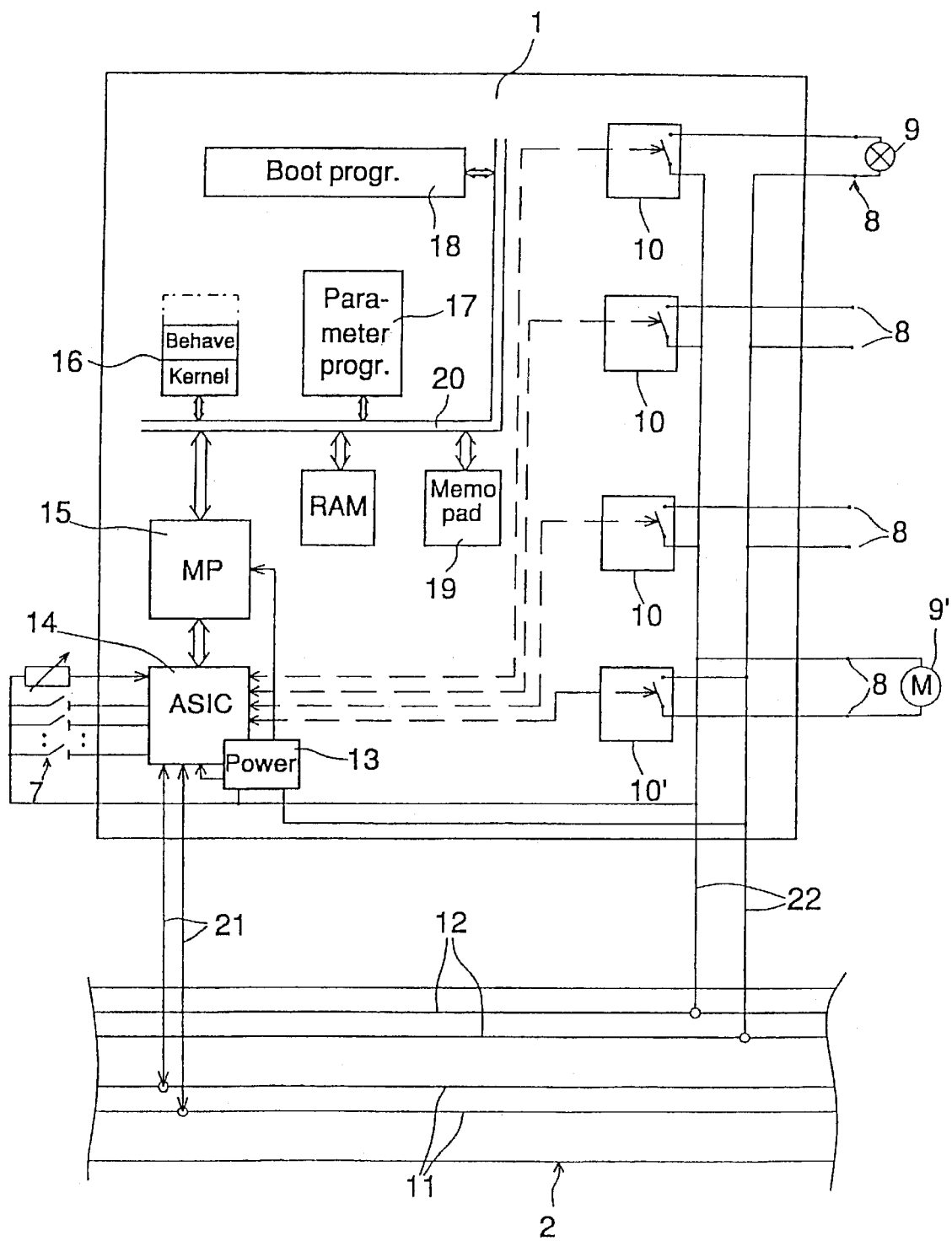

The invention will now be described in more detail with reference made to the accompanying drawings, in which
  FIG. 1 depicts a current distribution system of the invention in a schematic general view and
  FIG. 2 shows an individual socket in the system in a block diagram and connected to a current distribution cable.

FIG. 1 illustrates a typical automotive current distribution system, comprising eight cable branches 2 and one or more intelligent connecting socket 1 in each cable branch. A basic function of the socket 1 is feeding a working current to loads 9, such as lamps or actuators, which is why the socket is provided with controllable current switches 10 (FIG. 2) and output pins 8 connected therewith, in the present case four pairs to one socket.

The socket 1 includes a message communication section with three basic functions: reading control inputs coming from input switches 7, control of the current switches 10 feeding current to the actuators 9, and a serial message communication into a message communication bus constituted by code conductors 11 of the cable 2.

Contacts between the socket 1 and the cable 2 can be implemented by means of connecting pins 21 and 22 extending from the socket, which are pressed through a cable insulation into a direct contact with the code conductors and, respectively, current conductors 12 of the cable (FIG. 2).

The current and code conductors of various cable branches are coupled to respective current and code conductors of a ring cable 3, which connect the respective conductors 11, 12 of various cable branches together. Naturally, the ring cable 3 can be divided into separate ring cables, as far as the current and code conductors are concerned. The inlet ends of the cable branches 2 adjacent to the ring cable 3 can be fitted, as far as the current conductors are concerned, with conventional replaceable fuses. A current source 4 is connected to the current conductors of the ring cable 3. An adaptation and monitoring block 6 is connected to the code conductors of the ring cable 3. The adaptation and monitoring block 6 contains four functions: a transaction memory of the system existing even in a dead condition, and a controller for the operator's information display 5, as well as a surveillance of communication in the system, i.e. a reception of e.g. malfunction reports. In addition, the block 6 takes care of the adaptations of message communications in other exterior systems (such as electronic ignition system) and therethrough the system can be supplied with operating programs, so-called parameter programs, which contain simple selection codes and by which the individual operation control instructions of any socket 1 can be re-programmed, as described in more detail hereinafter.

The system does not include an actual central unit, which would control and drive the functions of other segments of the system but, instead, the intelligence of the system is decentralized to the intelligent sockets 1 present in the cable branches 2. Of course the adaption and monitoring unit may have some limited functions of a conventional central control unit but the command communication takes place mainly with direct inputs to the intelligent sockets on one hand, and between the sockets via the bus on the other hand, as explained later in more detail. Each socket 1 is capable of delivering operation control commands which are simultaneously available in all cable branches. The commands may be simultaneously identified by various sockets or the commands progress in a concatenated fashion from socket to socket after identification and transformation in each single socket. In other words, when one socket receives a certain command, it decodes contents of the command and, depending on the contents of the command, may transmit a similar or different command or a temporally delayed command addressed to another socket. The command addresses, however, are not usually socket specific addresses but function identification addresses. Such address is responded to by one or more sockets having operation control instructions corresponding to the function specified by the address. In this way, the mastering of the system is decentralized to several sockets such that a plurality of sockets are mastering either successively or in a combination of two or more sockets.

Also for this function of transmitting and receiving control commands, each socket must be individually programmed.

The sockets in the system are provided with an individual ordinal number or index number, on the basis of which they also may identify codes and messages addressed to themselves. Regardless of whether the codes are function specific or socket specific the communication from socket to socket can be carried out to any receiving socket.

Several sockets have input means for inputting commands in the system and the socket, through which the command was inputted in the system, is mastering or at least participates to mastering as far as all the sockets determined for performing the inputted command have acknowledged identification of the command. The system may have an input socket without power outputs. Such an input socket may have increased number of inputs and it may be placed in the instrument board.

The input connections of desired sockets 1 are fitted with manually operated control elements 7, such as switches, press keys, or turning knobs. The socket 1 is provided with a processor 15 for reading input data through an ASIC circuit 14 functioning as an I/O-interface. The ASIC circuit 14 also includes transmitters and receivers of the series communication path 11 as well as I/O-adaptations. Furthermore, the ASIC circuit 14 controls the current switches 10 of the socket outputs, which are e.g. FET transistors.

In view of protecting each switch fet 10, the ASIC circuit 14 includes a hardware protector which can switch off control of the FETs 10 regardless of program commands of the processor 15. The hardware protector measures a current passing through the FETs 10 and integrates the current intensity for defining a power loss remaining in an FET. Thus, the hardware protector release time depends not only on the strength but also on the duration of an over-current, i.e. a minor over-current is tolerated for a certain period of time but, upon detecting a short-circuit condition, the protector releases immediately. Following the release of the hardware protector, the program must switch the FET 10 back on. Protection of the FETs 10 involves also a measurement of temperature, which is used in case of excessive heating for switching the FET off and for switching the control back on after the temperature has dropped. In addition to a hardware protector, the current supply can be monitored by means of current measuring programmatically. This feature is called a software protector and it is used for monitoring that the current consumption of a given actuator 9 or 9' remains within a predetermined current window. In other words, surpassing the upper limit or falling short of the lower limit of a current window sets off a malfunction message in the message communication path 11. The current switch 10 contains also a no-load identification which functions when the switch is off. This load error is checked upon turning on the system and always upon switching on the appropriate load 9. All malfunctions (over-current, heat, and no-load) naturally lead to the transmission of a malfunction message.

The basic memory controlling the functions of a processor 15, i.e. an operative memory 16, can be entirely or partly inside the processor 15 and it may consist of several different types of sub-memories. The memory 16 contains a basic program (Kernel) controlling the operation of the processor 15, as well as function specific programs (so-called behave programs) controlling the modelled behaviour of components of the socket 1 to perform a number of predetermined functions.

The operative memory 16 of each of the system is programmed by factory settings to perform all required functions of any socket of the system for a predetermined vehicle type. The behave portion of the operative memory 16 can be enlarged also in the completed system by additional function specific programs (as shown by dash and dotted line).

This is required if new functions are added in the existing system.

Furthermore, each socket is required to have individual operating control instructions. Such socket specific operating control instructions include e.g.:

selection of those command signals to which the socket responds by identifying either the function identification or a socket specific address individual mode of operation for each socket to respond to selected messages ON/OFF-control of switches 10 (e.g. OFF-control based on time and/or an acknowledgement signal)

upper and lower limit for a current drawn by load 9 connected to output pins 8 accepted duration for the surge current of a load 9 connected to output pins 8, and priority level for the functions of loads 9 connected to various output pins 8.

These socket specific functions can be selected from a larger number of vehicle type specific functions by simple parameter programs which can be programmed rapidly and easily. The parameter programs used for controlling limited selections of individual operation control instructions vary even within the framework of a single system from one socket to another. In addition, the numbers and functions of sockets vary in systems intended for various makes of automobiles and even for various models of the same make. This results in a major technical problem in terms of manufacturing systems on automated lines. In the invention, the problem has been solved by means of a cooperation between the basic memory 16 and a special parameter program memory 17 of a socket 1. In the parameter program memory 17 there are stored individual parameter programs during the installation of a socket or after the installation, when the location of a socket and loads to be connected therewith are known, whereby the socket can be given an ordinal or index number for its identification. The parameter programs are short command sequences that instruct programs of the operative memory 16 to make various operational control selections, which are pre-appointed specifically for each socket of the system. Since the basic program memory 16 contains operating instruction programs (or sets of operation control instructions) for all necessary functions of any socket of the system, it is possible that all sockets of a single system and also of a limited variety of systems be mutually identical in this respect. The individuation, i.e. the selection of a limited number of socket specific function control programs for individual functions of the sockets, is effected by means of parameter programs, which are programmed into the parameter program memory 17 and which are predetermined specifically for each identified socket of the system. The identification or index number enables the programming of predetermined parameter programs exactly to the correct socket 1. The parameter programs run the operating programs of the basic program memory 16 only to make predetermined and socket specific operating control selections, whereby the functions of the appropriate socket only will be adopted. The processor 15 reads the contents of both memories 16 and 17 and only processes those functions controlled by the operative memory 16 whose processing instructions (or just processing authorization) is readable from the parameter program memory 17. Typically, it is just a small fraction of operating instructions contained in the operative memory 16 that will be processed. However, the price of modern memories is sufficiently low in relation to the capacity of the memory, such that the system as a whole will be a good value considering that the system can be readily designed for universal adaptation. The loading of the parameter program memory 17 can be carried out as early as in a conductor system manufacturing phase or it can also be effected through a block 6 after the system has been installed in a vehicle. A particular further benefit is achieved in the invention by virtue that any faulty socket 1 of the system can be replaced with a new standard socket, whose parameter program memory 17 is not loaded until after installation. This is done by feeding the communication bus 11 with short and readily loadable parameter programs predetermined for the ordinal or index number of this particular socket.

A loading program 18 is needed in the socket manufacturing phase for loading the basic memory 16 and possibly also subsequently for modifying or enlarging the behave section of the basic memory. A retain memory 19 is needed for storing certain last-selected functions for the time that the current is off in the current switch of a vehicle, whereby the last-selected functions return automatically back on, as the current is switched on again.

Some of the sockets 1 may be intended for reading inputs and for commanding other sockets. This specialization of sockets is also effected by parameter programs, which use the parameter program memory 17 to control the selections of functions driven by the operative memory 16. The sockets 1, which receive input messages from the bus 11 only, are naturally provided with a parameter program which selects the adoption of an input-message reading and processing program (present in the operative memory 16 for all sockets), serving this particular function.

Thus, the system of the invention can be implemented in such a way that a basic program 16 (Kernel+Behave) common to all sockets of the system is capable of performing the control of all functions of any socket, yet it is not capable of independently deciding as to which procedures are performed and when. Upon the arrival of any message in a socket, the basic program consults the socket specific individual programs loaded in the parameter memory for the procedures necessitated by the present message. The parameter programs, which are just short command sequences for making various operation selections, inform the basic program as to which procedures or sets of operation control instructions it must select to be carried out from the selection of all diverse procedures of the socket. Hence, the individual programs loaded in the parameter program memory 17 determine the operating responses to diverse messages individually for each socket.

A particular further advantage is gained in the invention by virtue that the function control commands need not be accompanied by any identification or address, indicating a socket that a command is intended for, but, instead, all sockets respond or fail to respond to a command as dictated by the individual parameter program of each socket. Thus, all that the commands are required to contain is information sufficient for identifying the commands. Such identification also points out as to which procedure is to be performed. It is up to each socket itself whether or not to carry out the procedure pointed out by a particular command. In some cases the same command may be responded by different procedures in different sockets.

Each command or message has one of the several different priority levels which are also programmed in behave programs (operation instruction programs) and/or in parameter programs (socket specific function control programs) of a plurality or all of the sockets. The priority level of any command or message is identified inherently by the program upon identification of the predetermined function. The priority level indication code is attached with the command or message under control of the particular behave or parameter program which is responsible on the transmitting of the command or message. With these provisions, if any function is ON when command of a new function is inputted, there are several options depending on the priority levels predefined for the functions: (1) the prevailing function may be maintained or (2) replaced by the new one or, if so allowed by the programs, (3) both functions are performed simultaneously.

So, any socket can communicate and perform functions at different priority levels depending on the priority levels of the functions they are dealing with.

The communication in the bus is started by any of the sockets. Each function specific message includes or is associated with a priority level indication address as a preamble of the message. The higher is the priority, the more easily the message passes to the bus. When a socket is first transmitting a priority level address it is simultaneously listening that the bus sets itself to the corresponding state "1" or "0". If several sockets are transmitting at the same time, they are first synchronized by a start bit and thereafter compare bit by bit the state of the bus with the bits of priority level address they are transmitting. If the transmitted and received bits are matching, the next priority level address bit is transmitted. The higher priority address has more zeros, which means that the lower address number with more zeros has higher priority level. If a socket is transmitting a recessive bit "1" of address and simultaneously receives a bus state "0", it means that there is on the bus a transmitting socket having message with higher priority. All the sockets which detect this deviation between transmitted and received bits, stop their transmission and remain to receive (listen). This bit arbitration passes through to the bus always the most important message with higher priority. After a predetermined time from the end of the message on the bus, transmitting of a new message is started by the same way, and this is continued as far as every socket desirable to transmit have transmitted. The explained bit arbitration with recessive bit "1" naturally provides proper impedance adaption between the microprocessor writing pin and the bus such that any "0" bit is dominating and can hold the bus at the corresponding state despite of one or more simultaneously transmitted "1" bits.

The priority level indication address may be the same as the function identification address or, it may be completed with further codes for the function identification and checking. Normally the message is composed of said address for combined priority level and function identification, of a data section and of a check digit. Each receiving socket checks from the check digit that the reading of the message was correct. If the checking fails, new message is immediately requested. As an additional checking, all messages are acknowledged to the transmitting socket. So, there is double checking for each control message.

It is usual that a socket performs a function inputted through its own input connector 7, but in terms of wiring requirements it is not practical to input all commands to the same sockets which are performing the corresponding function.

In a finished system the total number of sockets 1,2 is typically several tens, e.g. 30–100, and the number of cable branches is typically from 4 to 10. An additional advantage of the invention is in that the different outputs 8 of one and the same socket can be controlled by different sockets at different locations, and even the one and the same output 8 can be controlled to perform different functions at different times depending on the input means 7 used to control the output 8.

The invention is not limited to the above exemplary embodiment, but various modifications are obvious for a skilled person within the scope of the appended claims. For example, it is not necessary to use separate code lines 11 as the current conductors 12 can function as a message communication path. The switches 10 need not consist of separate components as a desired number of switches 10 can be integrated in a single component. There are ways other than the ring cable 3 for connecting the cable branches 2 to each other.

What is claimed is:

1. A method for manufacturing an intelligent current distribution system for vehicles wherein a current distribution cable is fitted with intelligent connecting sockets provided with output-connectors for supplying current to actuators to be connected to the system and switches for distributing current to the output connector, as well as control electronics for controlling the switches on the basis of control commands received from a message communication bus of the cable or an input connector of the socket, the control electronics of each socket being provided with basic program for running sets of operating control instructions to perform various functions determined by the control commands, the method comprising the steps of:

fitting a plurality of sockets with mutually similar or identical basic programs, the basic programs containing a set of operation control instructions for substantially all operations of a vehicle type;

installing the sockets on the cable;

providing identification numbers to the sockets; and, configuring the sockets, during or after installation, to function in an individual fashion by loading a parameter program memory of the sockets with socket specific function control programs for performing only a limited number of said set of operation control instructions, said limited number of operation control instructions being predetermined specifically for a particular one of the plurality of sockets by the identification number corresponding to the particular one socket, the parameter program memory controlling the basic programs to select the limited number of said set of operation control instructions that correspond to the specific action of the particular one socket.

2. An intelligent current distribution system for vehicles, said system comprising:

a current distribution cable having a current conductor;

a message communication bus;

a plurality of intelligent sockets connected to the current conductor and to the message communication bus; and control electronics on each of the plurality of intelligent sockets for controlling operation of a corresponding socket with control instructions specific for each of the plurality of sockets, the control instructions determining current distribution to the actuators, the actuators being connected to the socket by the controllable switches, the current distribution determined by control commands from an input-connector of the socket operably connected to the message communication bus and operation control instructions for transmitting malfunction or control message to the message communication path;

wherein each of the plurality of sockets further comprises:

a basic program memory to store operating instruction programs for substantially all necessary functions of the system, and a parameter program memory configured during or after the installation of a particular socket to store socket specific function control programs which are predetermined specifically for the particular socket, the socket specific function control programs controlling a limited number of the operating instruction programs of the basic program memory to select only the operation control instructions predetermined for individual operation of the particular socket.

3. An intelligent current distribution system as set forth in claim 2 wherein the sockets of the system are provided with identification numbers and each set of socket specific function control programs designated by the identification number contain all of the predetermined operation control selections of a corresponding single socket.

4. A current distribution system as set forth in claim 2 comprising a plurality of cable branches wherein the conductors of various cable branches are connected to the corresponding conductors of a common ring cable for connecting matching conductors of corresponding cable branches.

5. A system as set forth in claim 2 wherein the parameter program memory is updatable with any socket specific function control program by feeding desired socket specific function control programs into the message communication bus of the system together with a socket identification number.

6. A system as set forth in claim 2 wherein the operation control selections include an identification of those command signals whose socket is responding, an individual operating mode for a socket to respond to each identified message, an ON/OFF -control of the current switches, and an alarm threshold for a current drawn by the loads connected to the output-connectors of the said current switches.

7. A system as set forth in claim 2 wherein at least a portion of the control commands have no socket identification address but only a function identification address, whereby several sockets can simultaneously identify a command with one address.

8. A system as set forth in claim 2 wherein a plurality of sockets communicate with each other directly via the bus with messages having a priority level indication address which is at least partly the same as a function identification address of the message.

9. A system as set forth in claim 2 wherein the mastering of the system is decentralized to several sockets such that a plurality of sockets are mastering successively.

10. A system as set forth in claim 2 wherein several sockets have input means for inputting commands in the system and the socket, through which the command was inputted in the system, is mastering as far as all the sockets determined for performing the inputted command have acknowledged identification of the command.

11. A system as set forth in claim 2 wherein the operating instruction programs or the socket specific function control programs of a plurality of the sockets contain pre-programmed priority levels for the messages.

12. A system as set forth in claim 2 wherein different outputs of one and the same socket are controlled by two or more different sockets.

13. A system as set forth in claim 2 wherein one and the same load output of a socket is controlled to performed different functions at different time depending on the control input to the socket.

* * * * *